US012249280B2

(12) United States Patent
Zhang et al.

(10) Patent No.: US 12,249,280 B2
(45) Date of Patent: Mar. 11, 2025

(54) DISPLAY PANEL AND DISPLAY DEVICE FOR COMPENSATING FOR VOLTAGE DROP OF SIGNAL LINE BY MEASURING VOLTAGE AT DRIVING TRANSISTOR

(71) Applicant: Xiamen Tianma Display Technology Co., Ltd., Xiamen (CN)

(72) Inventors: Qingyue Zhang, Xiamen (CN); Xiaoyong Liu, Xiamen (CN); Zhida Zhu, Xiamen (CN); Jingxiong Zhou, Xiamen (CN); Zhiqiang Xia, Xiamen (CN)

(73) Assignee: XIAMEN TIANMA DISPLAY TECHNOLOGY CO., LTD., Xiamen (CN)

( * ) Notice: Subject to any disclaimer, the term of this patent is extended or adjusted under 35 U.S.C. 154(b) by 0 days.

(21) Appl. No.: 18/096,033

(22) Filed: Jan. 12, 2023

(65) Prior Publication Data

US 2024/0135874 A1 Apr. 25, 2024
US 2024/0233636 A9 Jul. 11, 2024

(30) Foreign Application Priority Data

Oct. 25, 2022 (CN) ........................ 202211311459.4

(51) Int. Cl.
*G09G 3/3233* (2016.01)

(52) U.S. Cl.
CPC ... *G09G 3/3233* (2013.01); *G09G 2300/0842* (2013.01); *G09G 2310/0202* (2013.01);
(Continued)

(58) Field of Classification Search
None
See application file for complete search history.

(56) References Cited

U.S. PATENT DOCUMENTS

2014/0306868 A1* 10/2014 Chaji ........................ G09G 3/32 345/77
2015/0356897 A1* 12/2015 Shin ..................... G09G 3/3233 345/211

(Continued)

FOREIGN PATENT DOCUMENTS

CN 106981268 A 7/2017
CN 110634432 A 12/2019

(Continued)

OTHER PUBLICATIONS

The First Office Action for Chinese Application No. 202211311459.4, dated Apr. 18, 2024, 11 pages.

*Primary Examiner* — Amr A Awad
*Assistant Examiner* — Donna V Bocar
(74) *Attorney, Agent, or Firm* — East IP P.C.

(57) ABSTRACT

The present application discloses a display panel and a display device. The display panel comprises pixel circuits, collecting modules and feedback modules, and the pixel circuit comprises a driving module, a data writing module and a light-emitting module; wherein the data writing module is configured to transmit a voltage output by a data signal terminal to the driving module; the driving module and the light-emitting module are electrically connected between a first power supply terminal and a second power supply terminal, and the driving module is configured to generate a driving current according to the voltage from the data signal terminal and a voltage from the first power supply terminal to drive the light-emitting module to emit light; the collecting module is configured to collect at least one of a voltage actually received by the driving module and a voltage actually received by the driving module.

11 Claims, 8 Drawing Sheets

(52) U.S. Cl.
CPC . *G09G 2310/08* (2013.01); *G09G 2320/0233* (2013.01); *G09G 2320/045* (2013.01)

(56) References Cited

U.S. PATENT DOCUMENTS

| | | | | |
|---|---|---|---|---|
| 2017/0061891 | A1 | 3/2017 | Qian et al. | |
| 2018/0151121 | A1* | 5/2018 | Lim | G09G 3/2081 |
| 2020/0335044 | A1* | 10/2020 | Kawachi | G09G 3/325 |
| 2023/0222963 | A1* | 7/2023 | Kim | G09G 3/2014<br>345/691 |

FOREIGN PATENT DOCUMENTS

| | | | |
|---|---|---|---|
| CN | 115206243 | A | 10/2022 |
| WO | 2017147908 | A1 | 9/2017 |

* cited by examiner

DISPLAY PANEL AND DISPLAY DEVICE FOR COMPENSATING FOR VOLTAGE DROP OF SIGNAL LINE BY MEASURING VOLTAGE AT DRIVING TRANSISTOR

CROSS-REFERENCE TO RELATED APPLICATION

This application claims priority to Chinese Patent Application No. 202211311459.4, filed on Oct. 25, 2022, which is incorporated herein by reference in its entirety.

TECHNICAL FIELD

The present application relates to the technology field of display, and particularly relates to a display panel and a display device.

BACKGROUND

Organic light-emitting diodes (OLEDs), as current-mode light-emitting devices, are increasingly used in high-performance display fields due to many features thereof such as self-light emission, fast response, wide viewing angle, ability of being able to be fabricated on flexible substrates and so on.

Due to a voltage drop of a signal line in a display panel, a greater difference exists between the actual brightness displayed by the OLED and the ideal brightness, so that the display panel easily suffers from a problem of display non-uniformity.

SUMMARY

Embodiments of the present application provide a display panel and a display device.

In a first aspect, embodiments of the present application provides a display panel, and the display panel comprises pixel circuits, collecting modules and feedback modules, and and the pixel circuit comprises a driving module, a data writing module and a light-emitting module; wherein the data writing module is configured to transmit a voltage output by a data signal terminal to the driving module; the driving module and the light-emitting module are electrically connected between a first power supply terminal and a second power supply terminal, and the driving module is configured to generate a driving current according to the voltage from the data signal terminal and a voltage from the first power supply terminal to drive the light-emitting module to emit light; the collecting module is configured to collect at least one of a voltage actually received by the driving module from the data signal terminal and a voltage actually received by the driving module from the first power supply terminal; and the feedback module is configured to determine a compensation voltage corresponding to the pixel circuit according to a voltage collected by the collecting module.

Based on a same inventive concept, in a second aspect, embodiments of the present application provides a display device including the display panel according to the embodiments of the first aspect.

BRIEF DESCRIPTION OF THE DRAWINGS

Other features, objects and advantages of the present application will become more apparent from the detailed description of non-limiting embodiments with reference to the drawings below. Here, the same or similar reference signs refer to the same or similar features, and the drawings are not drawn according to actual scale.

DETAILED DESCRIPTION

Figure 1:
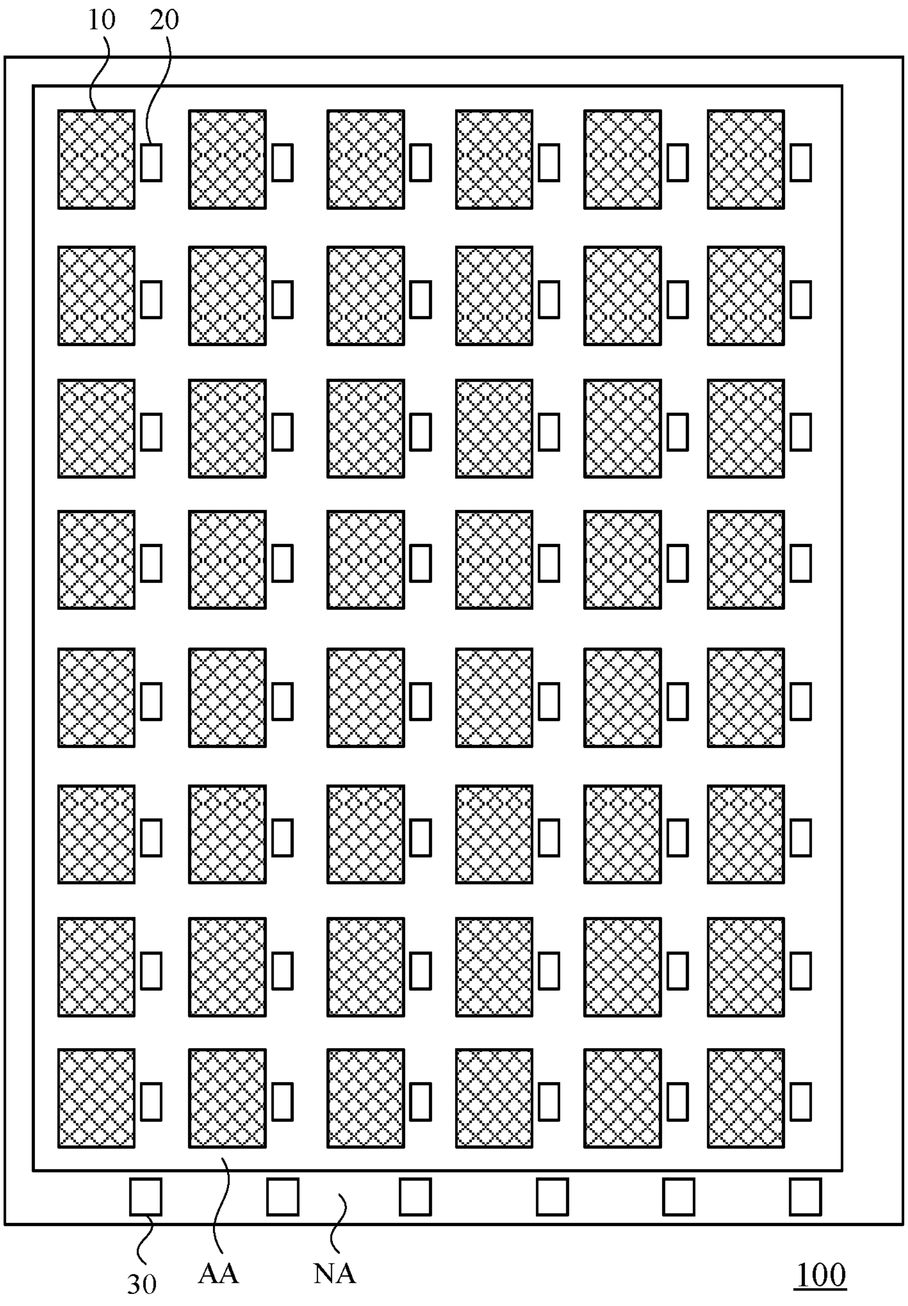
FIG. 1 shows a schematic structural diagram of a display panel according to an embodiment of the present application.

Features and exemplary embodiments of various aspects of the present application will be described in detail below. In order to make the objects, technical solutions and advantages of the present application clearer, the present application is further described in detail below with reference to the drawings and specific embodiments. It should be understood that, specific embodiments described herein are merely configured to illustrate the present application, not configured to limit the present application. For those skilled in the art, the present application may be implemented without some of these specific details. The following description of the embodiments is only for providing a better understanding of the present application by illustrating examples of the present application.

It should be noted that, herein, relational terms such as "first" and "second" are used only for distinguishing one entity or operation from another entity or operation, and do not necessarily require or imply any such actual relationship or order between these entities or operations. Moreover, the terms "comprising", "including", or any other variation thereof, are intended to encompass a non-exclusive inclusion, such that a process, a method, an article or a device including a series of elements not only includes these elements, but also includes other elements not explicitly listed, or includes elements inherent to the process, the method, the article or the device. Without further limitation, an element preceded by "including . . . " does not exclude presence of additional similar elements in a process, a method, an article or a device including the element.

It should be understood that, the term "and/or" used herein refers to only an association relationship for describing associated objects, which includes three possible kinds of relationships. For example, "A and/or B" may represent three possible cases including "A existing alone", "A and B existing simultaneously", and "B existing alone". In addition, the character "/" herein generally represents that there is an "or" relationship between the associated objects preceding and succeeding the character "/" respectively.

In the embodiments of the present application, the term "electrical connection" may refer to a direct electrical connection between two components, or may refer to an electrical connection between two components via one or more other components.

It will be apparent to those skilled in the art that various modifications and variations can be made to the present application without departing from the gist or scope of the present application. Accordingly, the present application is intended to cover the modifications and variations of the present application that fall within the scope of the appended claims (claimed technical solutions) and their equivalents. It should be noted that, the implementations provided by the embodiments of the present application may be combined with one another without conflict.

Before describing the technical solutions provided by the embodiments of the present application, in order to facilitate the understanding of the embodiments of the present application, the present application first specifically describes the problems existing in the related art.

A signal output by a signal terminal needs to be transmitted to each of pixel circuits via a certain length of signal line, and the signal output by the signal terminal to the pixel circuit is easily attenuated due to a voltage drop existing in a signal line of a display panel. In addition, due to a process difference, the signal voltage drop corresponding to each of the pixel circuits is different, resulting in a greater difference between actual brightness displayed by the OLED and ideal brightness, so that the display panel easily suffers from a problem of display non-uniformity.

The display brightness of the OLED is controlled by a driving circuit of the pixel circuit, and a driving current of the pixel circuit may be controlled by a power supply voltage from a power supply terminal (PVDD) and a data voltage from a data signal terminal (Data). A power supply signal line transmits the power supply voltage output by the power supply terminal (PVDD) to each of the pixel circuits, and a data line transmits the data voltage output by the data signal terminal (Data) to each of the pixel circuits. However, due to the voltage drop of the power supply signal line and the data line, a greater difference exists between an actual driving current and an ideal driving current, resulting in the greater difference between the actual brightness displayed by the OLED and the ideal brightness, so that the display panel easily suffers from problems of display non-uniformity and even persistence of vision.

In order to solve the above problems, embodiments of the present application provide a display panel and a display device, each of the embodiments of the display panel and the display device will be described below with reference to the drawings.

Figure 2:
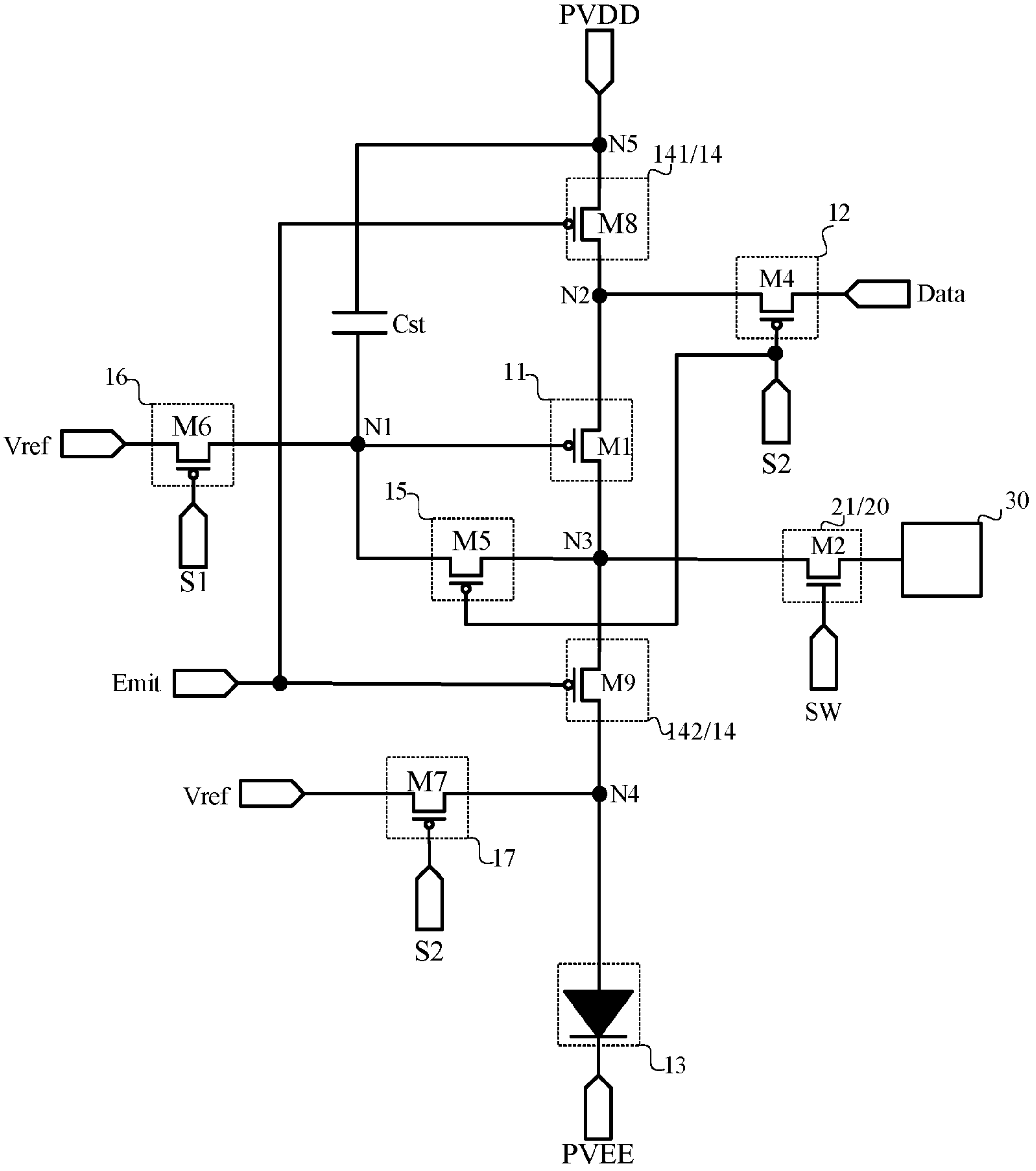
FIG. 2 shows a schematic structural diagram of a pixel circuit and a collecting module of a display panel according to an embodiment of the present application.

FIG. 1 shows a schematic structural diagram of a display panel according to an embodiment of the present application. FIG. 2 shows a schematic structural diagram of a pixel circuit of a display panel according to an embodiment of the present application. As shown in FIG. 1 and FIG. 2, a display panel 100 may include pixel circuits 10, collecting modules 20, and feedback modules 30. The collecting module 20 is electrically connected to the pixel circuit 10, and is configured to collect the voltage received by the pixel circuit 10 and transmit the collected voltage to the feedback module 30. The feedback module 30 is configured to determine a compensation voltage of the pixel circuit 30 according to the voltage collected by the collecting module 20.

The display panel 100 may include a display area AA and a non-display area NA. The pixel circuits 10 may be distributed in an array in the display area AA of the display panel. In order to be able to compensate each of the pixel circuits, the collecting modules 20 may be used for collecting the voltage of each of the pixel circuits 10. As an example, each of the pixel circuits 10 may be correspondingly provided with one collecting module 20, respectively, and all or a part of a plurality of collecting modules 20 may be disposed in the display area AA of the display panel. The pixel circuit 10 and its corresponding collecting module 20 may be arranged adjacent to each other.

As an example, the feedback module 30 may be arranged in the non-display area NA of the display panel.

The pixel circuit 10 may include a driving module 11, a data writing module 12 and a light-emitting module 13. The data writing module 12 is configured to transmit a voltage output by a data signal terminal Data to the driving module 11. The driving module 11 and t light-emitting module 13 are electrically connected between a first power supply terminal PVDD and a second power supply terminal PVEE, and the driving module 11 is configured to generate a driving current according to a voltage from the data signal terminal Data and a voltage from the first power supply terminal PVDD to drive the light-emitting module 13 to emit light.

Specifically, the collecting module 20 is configured to collect at least one of a voltage actually received by the driving module 11 from the data signal terminal Data and a voltage actually received by the driving module 11 from the first power supply terminal PVDD. The feedback module 30 is configured to determine a compensation voltage of the pixel circuit according to the voltage collected by the collecting module 20. A voltage of the first power supply terminal PVDD may be referred to as a power supply voltage, and a voltage of the data signal terminal Data may be referred to as a data voltage. The compensation voltage determined by the feedback module 30 may be stored in a storage module of a driving chip, and when the display panel to be displayed displays normally, the driving chip may compensate the compensation voltage corresponding to each of the pixel circuits to the pixel circuit.

For example, under a condition that a voltage collected by the collecting module 20 is a voltage actually received by the driving module 11 from the data signal terminal Data, then the feedback module 30 may determine a compensation voltage of the data voltage corresponding to the pixel circuit 30. For another example, under a condition that a voltage collected by the collecting module 20 is a voltage actually received by the driving module 11 from the first power supply terminal PVDD, then the feedback module 30 may determine a compensation voltage of the power supply voltage corresponding to the pixel circuit 30.

According to the display panel provided by the embodiments of the present application, since the collecting modules and the feedback modules are provided, the collecting module may collect a power supply voltage and/or a data voltage actually received by the pixel circuit, and the feedback module may determine the compensation voltage according to the voltage collected by the collecting module. Therefore, when displaying, the pixel circuit may be compensated according to a determined compensation voltage to improve display accuracy of the display panel, thereby mitigating problems such as display non-uniformity and even persistence of vision caused by the voltage drop of the signal line.

In an example, the first power supply terminal PVDD may be configured to provide a positive polarity power supply voltage, and a second power supply terminal PVEE may be configured to provide a negative polarity power supply voltage. The light-emitting module 13 may include the OLED. An anode of the light-emitting module 13 may be electrically connected to the driving module 11, and a cathode of the light-emitting module 13 may be electrically connected to the second power supply terminal PVEE.

The drawings of the present application show only a part of an exemplary circuit structure of the pixel circuit, which is not intended to limit the present application. It can be understood that a solution provided by the embodiments of the present application is applicable as long as the pixel circuit needs to receive the voltage of the first power supply terminal PVDD and/or the voltage of the data signal terminal Data.

In some optional embodiments, as shown in FIG. 2, the driving module 11 may include a first transistor M1, a first terminal of the first transistor M1 may be electrically connected to the first power supply terminal PVDD, and a second terminal of the first transistor M1 may be electrically connected to a first terminal of the light-emitting module 13. The first terminal of the light-emitting module 13 may be an anode of the light-emitting module 13, and a second terminal of the light-emitting module 13 may be a cathode of the light-emitting module 13. The collecting module 20 may include a first collecting module 21. The first collecting module 21 may include a control terminal, a first terminal and a second terminal, the control terminal of the first collecting module 21 may be electrically connected to a control signal terminal SW, and a control signal output by the control signal terminal SW may control the first collecting module 21 to be turned on and off. An operation process of the pixel circuit may include at least a light-emitting stage, and in the light-emitting stage, a power supply voltage provided by the first power supply terminal PVDD may be transmitted to the first transistor M1, and the first transistor M1 may generate a driving current according to the power supply voltage received by the first transistor M1 from the first power supply terminal PVDD and a data voltage from the data signal terminal Data, and drive the light-emitting module 13 to emit light.

In order to ensure that a voltage actually received by the first transistor M1 from the first power supply terminal PVDD can be effectively collected, the first collecting module 21 can be configured to collect the voltage actually received by the first transistor M1 from the first power supply terminal PVDD in the light-emitting stage of the pixel circuit. It can be understood that, under a condition that an operation mode of the display panel is a collecting mode, and at least in the light-emitting stage of the pixel circuit, the first collecting module 21 is under an ON-state.

In the light-emitting stage of the pixel circuit, a path from the first power supply terminal PVDD to the second power supply terminal PVEE is a current path, and in the light-emitting stage of the pixel circuit, the first collecting module 21 may be configured to collect a voltage of any node on this path as a voltage actually received by the pixel circuit from the first power supply terminal PVDD.

The first power supply terminal PVDD is connected to each of the pixel circuits by power supply lines, voltage drops of the power supply lines corresponding to the pixel circuits at different positions are different, and therefore a difference exists in voltages actually received by the pixel circuits at different positions from the first power supply terminal PVDD. In order to collect the voltage actually received by the pixel circuit from the first power supply terminal PVDD more accurately, a connection node of the first collecting module 21 and the pixel circuit may be close to the first transistor M1 in the pixel circuit.

As an example, as shown in FIG. 2, a first terminal of the first collecting module 21 may be electrically connected between the second terminal of the first transistor M1 and the first terminal of the light-emitting module 13, and a second terminal of the first collecting module 21 is electrically connected to the feedback module 30.

Figure 3:
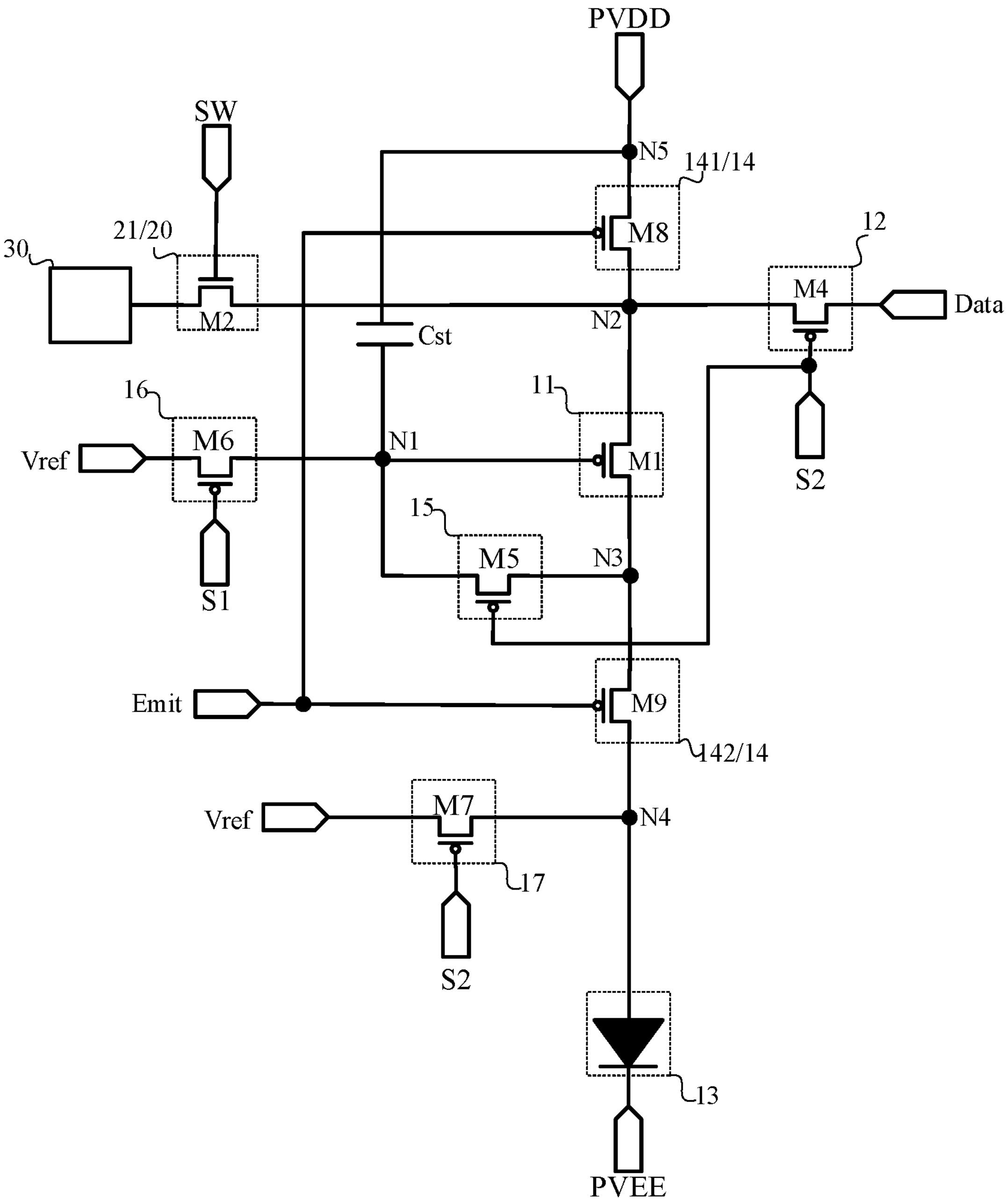
FIG. 3 shows another schematic structural diagram of a pixel circuit and a collecting module of a display panel according to an embodiment of the present application.

As another example, as shown in FIG. 3, the first terminal of the first collecting module 21 may be electrically connected between the first terminal of the first transistor M1 and the first power supply terminal PVDD, and the second terminal of the first collecting module 21 may be electrically connected to the feedback module 30.

In some optional embodiments, as shown in FIG. 2, the pixel circuit may also include a light-emitting controlling module 14 including a first light-emitting controlling module 141 and a second light-emitting controlling module 142. The first light-emitting controlling module 141 is electrically connected between the first power supply terminal PVDD and the first terminal of the first transistor M1, and the second light-emitting controlling module 142 is electrically connected between a second terminal of the first transistor M1 and the first terminal of the light-emitting module 13. For example, a first terminal of the first light-emitting controlling module 141 is electrically connected to the first power supply terminal PVDD, and a second terminal of the first light-emitting controlling module 141 and the first terminal of the first transistor M1 are electrically connected to a second node N2. A first terminal of the second light-emitting controlling module 142 and the second terminal of the first transistor M1 are electrically connected to a third node N3, and a second terminal of the second light-emitting controlling module 142 and the first terminal of the light-emitting module 13 are electrically connected to a fourth node N4. A node between the first terminal of the first light-emitting controlling module 141 and the first power supply terminal PVDD is a fifth node N5.

Under a condition that the first light-emitting controlling module 141 and the second light-emitting controlling module 142 are turned on, the pixel circuit is in the light-emitting stage; under a condition that the second light-emitting controlling module 142 is turned off, the pixel circuit is in a non-light-emitting stage.

The first light-emitting controlling module 141 and the second light-emitting controlling module 142 may be turned on or turned off under a condition that a signal is provided by a light-emitting controlling signal terminal Emit. The display panel may include a plurality of rows of pixel circuits, and control terminals of first light-emitting controlling modules 141 and control terminals of second light-emitting controlling modules 142 of the pixel circuits on a same row may be electrically connected to a same light-emitting controlling signal terminal Emit. Under a condition that the operation mode of the display panel is the collecting mode, the pixel circuits on the same row may be in the light-emitting stages at a same time, and the first collecting modules 21 corresponding to each of the plurality of the pixel circuits on the same row may be configured to simultaneously collect the voltages actually received by the plurality of the pixel circuits on the same row from the first power supply terminal PVDD.

As described above, in the light-emitting stage of the pixel circuit, the path from the first power supply terminal PVDD to the second power supply terminal PVEE is the current path, and in the light-emitting stage of the pixel circuit, the first collecting module 21 may be configured to collect the voltage of any node on this path as the voltage actually received by the pixel circuit from the first power supply terminal PVDD. In an example, the first terminal of the first collecting module 21 may be electrically connected to any one of a first node N1, the second node N2, the third node N3, the fourth node N4, and the fifth node N5. However, a direct influence of the voltage of the first power supply terminal PVDD on the pixel circuit lies in the first transistor M1, and in order to further ensure that the first collecting module 21 collects the voltage actually received by the first transistor M1 from the first power supply terminal PVDD, the first collecting module 21 may be electrically connected to the second node N2 or the third node N3. That is, as shown in FIG. 2, the first terminal of the first collecting module 21 may be electrically connected to the second terminal of the first transistor M1. Or, the first terminal of the first collecting module 21 may be electrically connected to the first terminal of the first transistor M1.

Through research, the inventors of the present application have found that, a difference actually exists in threshold voltages Vth of the first transistors M1 of different pixel circuits, however, under a condition that the first terminal of the first collecting module 21 is electrically connected to the second terminal of the first transistor M1, the threshold voltage of the first transistor M1 may further be collected, and thus the threshold voltage of the first transistor M1 may be compensated, so that the display uniformity may be further improved.

In some optional embodiments, as shown in FIG. 2, the first collecting module 21 may include a second transistor M2, a first terminal of the second transistor M2 is the first terminal of the first collecting module 21, a second terminal of the second transistor M2 is the second terminal of the first collecting module 21, and a gate of the second transistor M2 is the control terminal of the first collecting module 21. The gate of the second transistor M2 is electrically connected to the control signal terminal SW. The control signal terminal SW may be a signal output terminal of a digital circuit. The control signal terminal SW may output a level that controls the second transistor M2 to be turned on and a level that controls the second transistor M2 to be turned off.

In the embodiments of the present application, collecting of the voltage received by the pixel circuit may be achieved by providing the transistor, and the circuit structure is simple and easy to implement, which is beneficial to reduce costs.

The second transistors M2 need to collect the voltage in the light-emitting stages of the pixel circuits, and in order to reduce an influence of a leakage current of the second transistors M2 on the driving current, the second transistors M2 may include NMOS type transistors. In an example, the second transistor M2 may be an Indium Gallium Zinc Oxide (IGZO) type NMOS transistor.

In some optional embodiments, an operation mode of the display panel may include a collecting mode and a normal display mode. The second transistor M2 is turned on under the operation mode to ensure that the voltage actually received by the first transistor M1 from the first power supply terminal PVDD can be collected. The second transistor M2 may be turned off under the normal display mode to avoid having an influence on normal display of the display panel.

Figure 4:
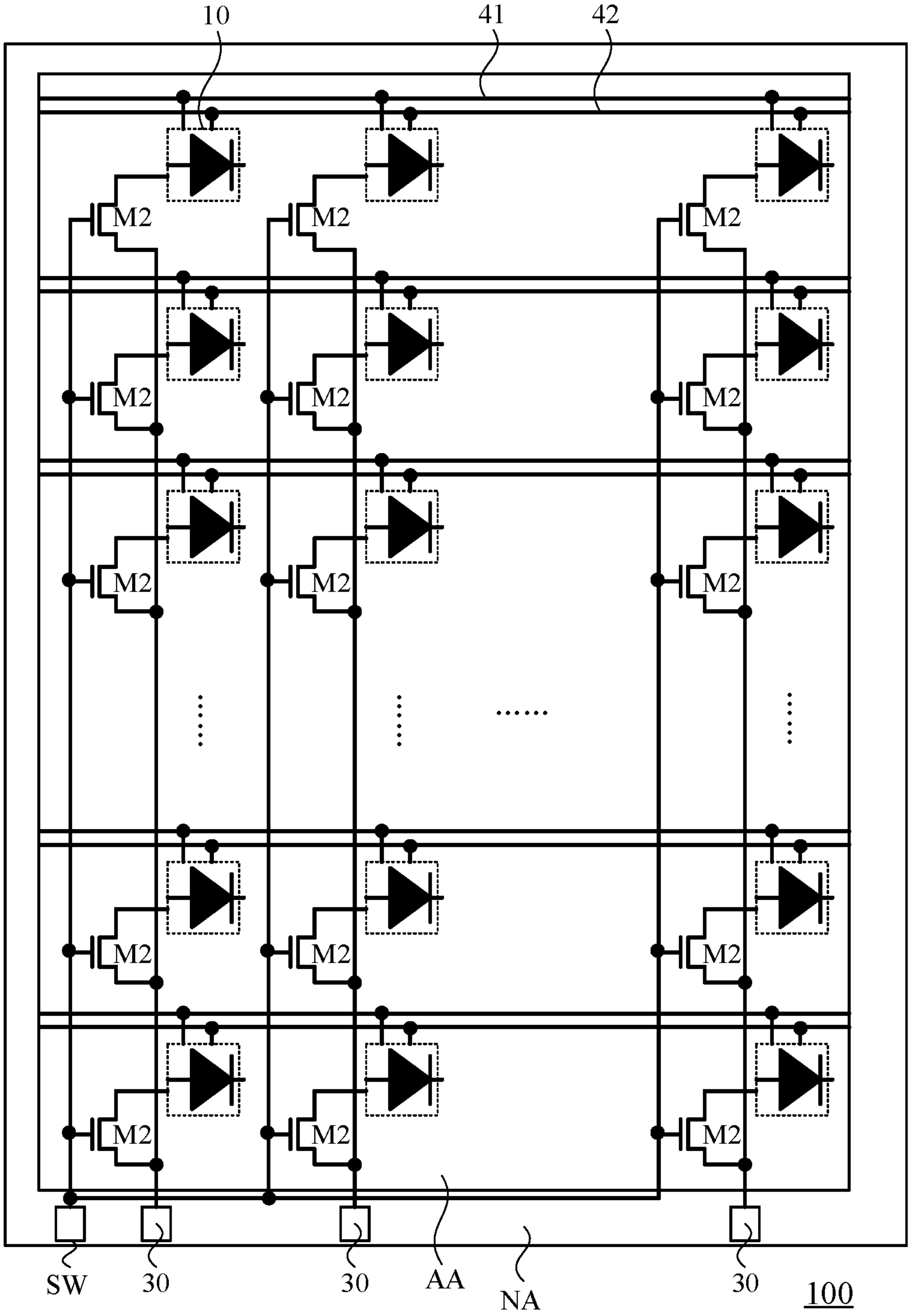
FIG. 4 shows another schematic structural diagram of a display panel according to an embodiment of the present application.

In some optional embodiments, as shown in FIG. 4, gates of the second transistors M2 corresponding to a plurality of pixel circuits 10 are electrically connected to a same control signal terminal SW. As such, an ON-state and an OFF-state of the plurality of second transistors M2 may be controlled by providing only one control signal terminal SW with a simple structure.

It is understood that the plurality of second transistors M2 connected to the same control signal terminal SW have a same state at the same time. As an example, the second transistors M2 may be provided in one-to-one correspondence with the pixel circuits 10, and the gates of all the second transistors M2 are electrically connected to the same control signal terminal SW.

In order to clearly show a connection relationship of the second transistors M2, only light-emitting elements of the pixel circuits 10 are shown in FIG. 4, and other modules of the pixel circuits 10 are shown in a hidden way.

In some optional embodiments, the display panel may include pixel circuits 10 arranged on a plurality of rows and a plurality of columns, and as shown in FIG. 4, second terminals of second transistors M2 corresponding to the plurality of pixel circuits 10 on a same column are electrically connected to a same feedback module 30, and the pixel circuits 10 on one column correspond to one feedback module 30.

Under a condition that the display panel is under the collecting mode, the pixel circuits of the display panel may enter the light-emitting stages row by row; although the gates of the second transistors M2 corresponding to the pixel circuits 10 on the same column are electrically connected to the same control signal terminal SW, in fact, the second transistors M2 also collect the voltage actually received by the first transistors M1 of the pixel circuits 10 on the same column from the first power supply terminal PVDD row by row, so that the feedback module 30 is triggered to record the voltage actually received by the first transistors M1 of the pixel circuits 10 on this column from the first power supply terminal PVDD when the pixel circuits 10 enter the light-emitting stages, and therefore the compensation voltage can be further calculated subsequently.

In an example, under a condition that the display panel is under the collecting mode, the pixel circuits on the same row may enter the light-emitting stages at the same time.

For a better operation process under the collecting mode, as shown in FIG. 2, the pixel circuit 10 may further include a threshold compensation module 15, a first reset module 16, a second reset module 17 and a storage capacitor Cst. In an example, the driving module 11 includes the first transistor M1, the first collecting module 20 includes the second transistor M2, the data writing module 12 includes a fourth transistor M4, the threshold compensation module 15 includes a fifth transistor M5, the first reset module 16 includes a sixth transistor M6, the second reset module 17 includes a seventh transistor M7, the first light-emitting controlling module 141 includes an eighth transistor M8, the second light-emitting controlling module 142 includes a ninth transistor M9, and connection of the various elements and modules may be shown as FIG. 2 or FIG. 3 and will not be repeated herein. A first scanning signal terminal is labelled as S1, a second scanning signal terminal is labelled as S2, a reset signal terminal is labelled as Vref, and the gate of the first transistor M1 is electrically connected to the first node N1.

With reference to FIG. 2 and FIG. 4, a gate of the sixth transistor M6 may be electrically connected to the first scanning signal terminal S1 by a first scanning line 41, and a gate of the fourth transistor M4 and a gate of the fifth transistor M5 may be electrically connected to the second scanning signal terminal S2 by a second scanning line 41.

Control terminals of data writing modules 12 of the pixel circuits on the same row are electrically connected to a same scanning line, for example, gates of the fourth transistors M4 of the pixel circuits on the same row are electrically connected to a same second scanning line 42. In addition, control terminals of first reset modules 16 of the pixel circuits on the same row are electrically connected to a same scanning line, for example, gates of the sixth transistors M6 of the pixel circuits on the same row are electrically connected to a same first scanning line 41. The control terminals of the first light-emitting controlling modules 141 and the control terminals of the second light-emitting controlling modules 142 of the pixel circuits on the same row may be electrically connected to a same light-emitting controlling signal line (not shown in FIG. 4), for example, gates of eighth transistors M8 and gates of ninth transistors M9 of the pixel circuits on the same row are electrically connected to a same light-emitting controlling signal line.

A plurality of pixel circuits 10 may be connected to a same first power supply terminal PVDD by the power supply signal line (not shown in the figure). As an example, the plurality of pixel circuits 10 on the same row may be connected to the same first power supply terminal PVDD by the power supply signal line; and/or, the plurality of pixel circuits 10 on a same column may be connected to the same first power supply terminal PVDD by the power supply signal line. The power supply signal line may be in a grid-like structure, so that all pixel circuits 10 of the display panel may be connected to the same first power terminal PVDD by the power supply signal line.

The display panel may include a collecting mode and a normal display mode. Under the collecting mode, the collecting module 20 may be configured to collect a voltage actually received by the driving module 11 from the first power supply terminal PVDD, and the feedback module 30 may then be configured to determine a first compensation voltage corresponding to the pixel circuit 10 according to the voltage collected by the collecting module 20.

Under the collecting mode, the first power supply terminal PVDD may be configured to output a same initial power supply voltage $U_{out}$ to each of the pixel circuits 10, and for an $i^{th}$ pixel circuit, the voltage actually received by the driving module 11 from the first power supply terminal PVDD and collected by the collecting module 20 is $U_i$, and then a first compensation voltage $Ui_{comp}=U_{out}-U_i$ corresponding to the $i^{th}$ pixel circuit may be determined. Under the normal display mode, the first power supply terminal PVDD is configured to output a plurality of target power supply voltages to a plurality of the pixel circuits respectively by time, and the target power supply voltage is a sum of the initial power supply voltage and the first compensation voltage. For example, a target power supply voltage corresponding to the $i^{th}$ pixel circuit is a sum of an initial power supply voltage $U_{out}$ and a first compensation voltage $Ui_{comp}$.

As such, even if the plurality of pixel circuits are connected to the same first power supply terminal PVDD, since the first power supply terminal PVDD is configured to output target power supply voltages required by the plurality of pixel circuits respectively by time, a power supply voltage of each of the pixel circuits may be compensated.

Figure 5:
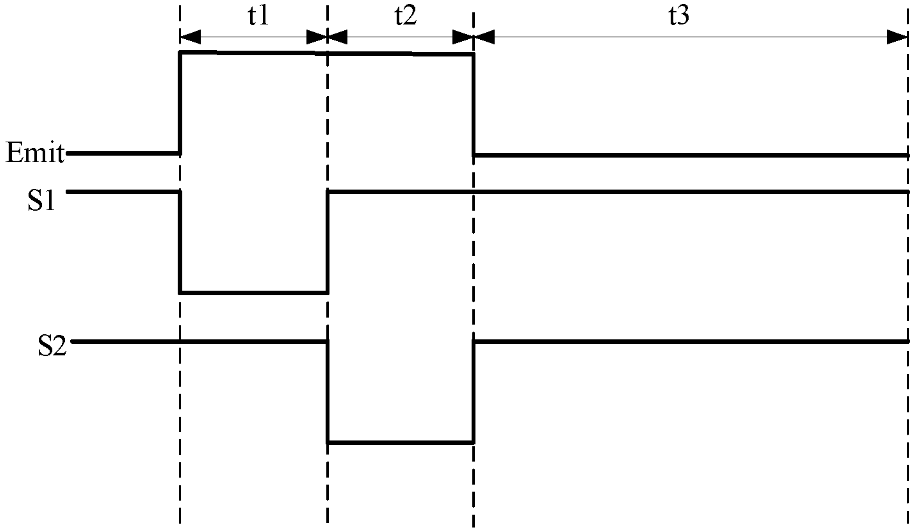
FIG. 5 shows a schematic diagram of a time sequence of a pixel circuit of a display panel according to an embodiment of the present application.

FIG. 5 specifically shows a schematic diagram of a time sequence of a pixel circuit of a display panel according to an embodiment of the present application. With reference to FIG. 2 and FIG. 5, when the display panel is under the collecting mode or the normal display mode, an operation process of the pixel circuit may include a reset stage t1, a data writing stage t2 and a light-emitting stage t3.

In the reset stage t1, the first scanning signal terminal S1 provides an ON-level, the sixth transistor M6 is turned on, and a reset voltage provided by the reset signal terminal Vref is transmitted to the gate of the first transistor M1 to reset potential of the gate of the first transistor M1.

In the data writing stage t2, the second scanning signal terminal S2 provides an ON-level, the fourth transistor M4 and the fifth transistor M5 are turned on, and the first transistor M1 is turned on, a data voltage provided by the data signal terminal Data is transmitted to the gate of the first transistor M1, and the fifth transistor M5 compensates the threshold voltage of the first transistor M1.

In the light-emitting stage t3, the light-emitting control signal terminal Emit provides an ON-level, the eighth transistor M8 and the ninth transistor M9 are turned on, the power supply voltage provided by the first power supply terminal PVDD is transmitted to the first terminal and second terminal of the first transistor M1, the first transistor M1 generates a driving current, the driving current is transmitted to the light-emitting module 13, and the light-emitting module 13 emits light.

It can be understood that, under the normal display mode, the target power supply voltage provided by the first power supply terminal PVDD needs to be transmitted to the driving module 11, so that the driving module 11 may generate a driving current to cause the pixel circuit to enter the light-emitting stage, and the light-emitting module 13 emits light and displays. For example, the $i^{th}$ pixel circuit and a $j^{th}$ pixel circuit are electrically connected to a same first power supply terminal PVDD, and target power supply voltages required by the $i^{th}$ pixel circuit and the $j^{th}$ pixel circuit are different. Under a condition that light-emitting stages of the $i^{th}$ pixel circuit and the $j^{th}$ pixel circuit have a temporal overlap, the first power supply terminal PVDD provides a same voltage to the $i^{th}$ pixel circuit and the $j^{th}$ pixel circuit, so that accurate voltage compensation for each of the pixel circuits cannot be achieved. In order to achieve the accurate voltage compensation for each of the pixel circuits, under the normal display mode, in a duration of an image frame, light-emitting stages of a plurality of the pixel circuits electrically connected to a same first power supply terminal PVDD have no temporal overlap.

As an example, under a condition that the pixel circuits on the same row are electrically connected to the same first power supply terminal PVDD, in a duration of an image frame, the first power supply terminal PVDD may output target power supply voltages required by each of the pixel circuits on the same row respectively by time. Therefore, the pixel circuits on the same row may enter light-emitting stages sequentially, so that the pixel circuits on the same row may emit light sequentially. Under a condition that the pixel circuits on a same column are electrically connected to the same first power supply terminal PVDD, in a duration of an image frame, the first power supply terminal PVDD may output target power supply voltages required by each of the pixel circuits on the same column respectively by time. Therefore, the pixel circuits on the same column also enter the light-emitting stages sequentially, so that the pixel circuits on the same row also emit light sequentially.

It can be understood that, under a condition that all pixel circuits of the display panel are electrically connected to a same first power supply terminal PVDD, in a duration of an image frame, the first power supply terminal PVDD may output target power supply voltages required by all pixel circuits respectively by time. Therefore, the pixel circuits of the display panel may enter the light-emitting stages sequentially, so that the pixel circuits may emit light sequentially.

For example, the first power supply terminal PVDD may first output a target power supply voltage required by a first pixel circuit on a first row, and the first pixel circuit on the first row emits light first; then, the first power supply terminal PVDD may output a target power supply voltage required by a second pixel circuit on the first row, and the second pixel circuit on the first row then emits light; by analogy, the first power supply terminal PVDD may output a target power supply voltage required by a last pixel circuit on the first row, and the last pixel circuit on the first row emits light at last; sequentially, the first power supply terminal PVDD may output a target power supply voltage required by a first pixel circuit on a second row, and the first pixel circuit on the second row emits light sequentially; by analogy, the first power source terminal PVDD may output a target power source voltage required by a last pixel circuit on a last row, and the last pixel circuit on the last row may emit light at last.

In some optional embodiments, as described above, control terminals of data writing modules 12 of the pixel circuits on a same row are electrically connected to a same scanning line. In an example of the pixel circuit shown in FIG. 2, gates of fourth transistors M4 of the pixel circuits on a same row are electrically connected to a same second scanning line 42.

When a signal on the second scanning line 42 is a valid pulse, the fourth transistor M4 and the fifth transistor M5 may be controlled to be turned on and turned off. It can be understood that the pixel circuits are in the data writing stage t2 when the signal on the second scanning line 42 is the valid pulse. Potential of the valid pulse depends on a type of the transistors that the valid pulse controls, for example, under a condition that the fourth transistors M4 are P-type transistors, the signal on the second scanning line 42 is the valid pulse when the signal is at a low level.

In a duration of an image frame, a number of times that the signal on the scanning line 42 is the valid pulse is equal to a number of the pixel circuits on the same row. For example, under a condition that the number of the pixel circuits on one row is n and n is an integer greater than or equal to 2, the number of times that the signal on the second scanning line 42 is the valid pulse is also n. A plurality of valid pulses on the second scanning line 42 correspond to a plurality of pixel circuits on one row on a one-to-one basis, so that desired target data voltages of the pixel circuits may be written in the data writing stage corresponding to each of the pixel circuits.

In an example, in a duration of an image frame, the operation process may be divided into n cycles for n pixel circuits on a same row. Each of the cycles may include the reset stage t1, the data writing stage t2, and the light-emitting stage t3. In each of the cycles, the signal on the second scanning line 42 may include one valid pulse, that is, the second scanning signal terminal S2 may provide one valid pulse. In addition, in each of the cycles, the first scanning signal terminal S1 may provide one valid pulse and the light-emitting control signal terminal Emit may provide one valid pulse.

Figure 6:
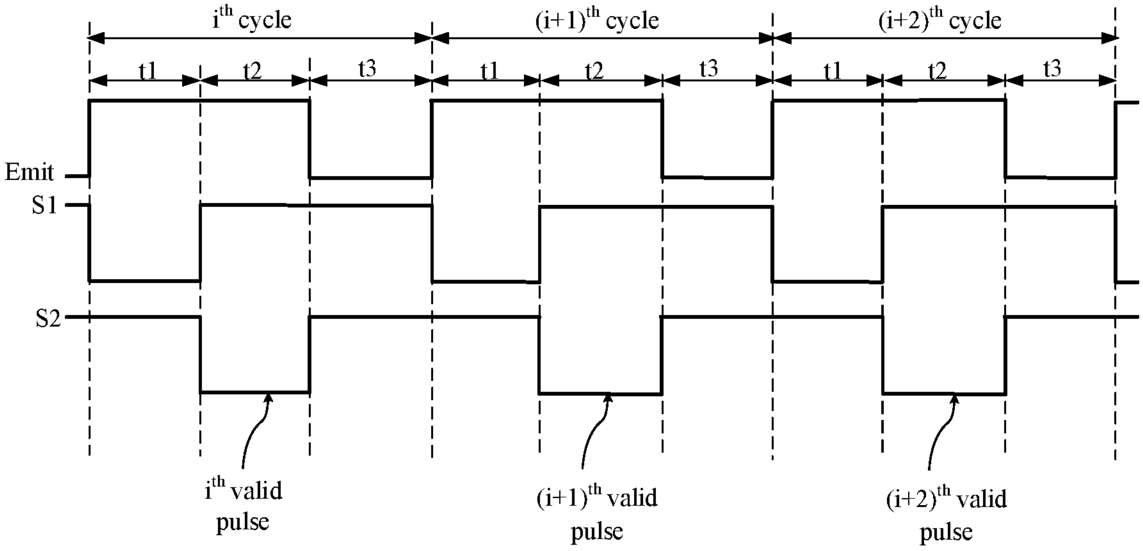
FIG. 6 shows another schematic diagram of a time sequence of a pixel circuit of a display panel according to an embodiment of the present application.

For the pixel circuits on any row, as shown in FIG. 6, in a data writing stage t2 of an $i^{th}$ cycle, the second scanning line 42 transmits an $i^{th}$ valid pulse provided by the second scanning signal terminal S2, a target data voltage corresponding to the $i^{th}$ pixel circuit may be written into the $i^{th}$ pixel circuit, and in a light-emitting stage t3 of the $i^{th}$ cycle, a light-emitting module of the $i^{th}$ pixel circuit emits light and displays normally.

In a data writing stage t2 of a $(i+1)^{th}$ cycle, the second scanning line 42 transmits a $(i+1)^{th}$ valid pulse provided by the second scanning signal terminal S2, a target data voltage corresponding to a $(i+1)^{th}$ pixel circuit may be written into the $(i+1)^{th}$ pixel circuit, and in a light-emitting stage t3 of the $(i+1)^{th}$ cycle, a light-emitting module of the $(i+1)^{th}$ pixel circuit emits light and displays normally. And a black-state data voltage is written into the $i^{th}$ pixel circuit in the data writing stage t2 of the $(i+1)^{th}$ cycle, so that the light-emitting module of the $i^{th}$ pixel circuit is in a black state (does not emit light) in the data writing stage t2 of the (i+1) th cycle.

By analogy, in a data writing stage t2 of a $(i+2)^{th}$ cycle, the second scanning line 42 transmits a $(i+2)^{th}$ valid pulse provided by the second scanning signal terminal S2, a target data voltage corresponding to the $(i+2)^{th}$ pixel circuit is written into the $(i+2)^{th}$ pixel circuit, and in a light-emitting stage t3 of the $(i+2)^{th}$ cycle, a light-emitting module of the $(i+2)^{th}$ pixel circuit emits light and displays normally. And the black-state data voltage is written into the $(i+1)^{th}$ pixel circuit in the data writing stage t2 of the $(i+2)^{th}$ cycle, so that the light-emitting module of the $(i+1)^{th}$ pixel circuit is in the black state (does not emit light) in the data writing stage t2 of the $(i+2)^{th}$ cycle. In addition, since the first scanning signal terminal S1 provides the $(i+2)^{th}$ valid pulse in a reset stage t1 of the $(i+2)^{th}$ cycle, in order to ensure that the light-emitting module of the $i^{th}$ pixel circuit continues to be in the black state in the light-emitting stage t3 of the $(i+2)^{th}$ cycle, the black-state data voltage may be written into the $i^{th}$ pixel circuit again in the data writing stage t2 of the $(i+1)^{th}$ cycle.

Figure 7:
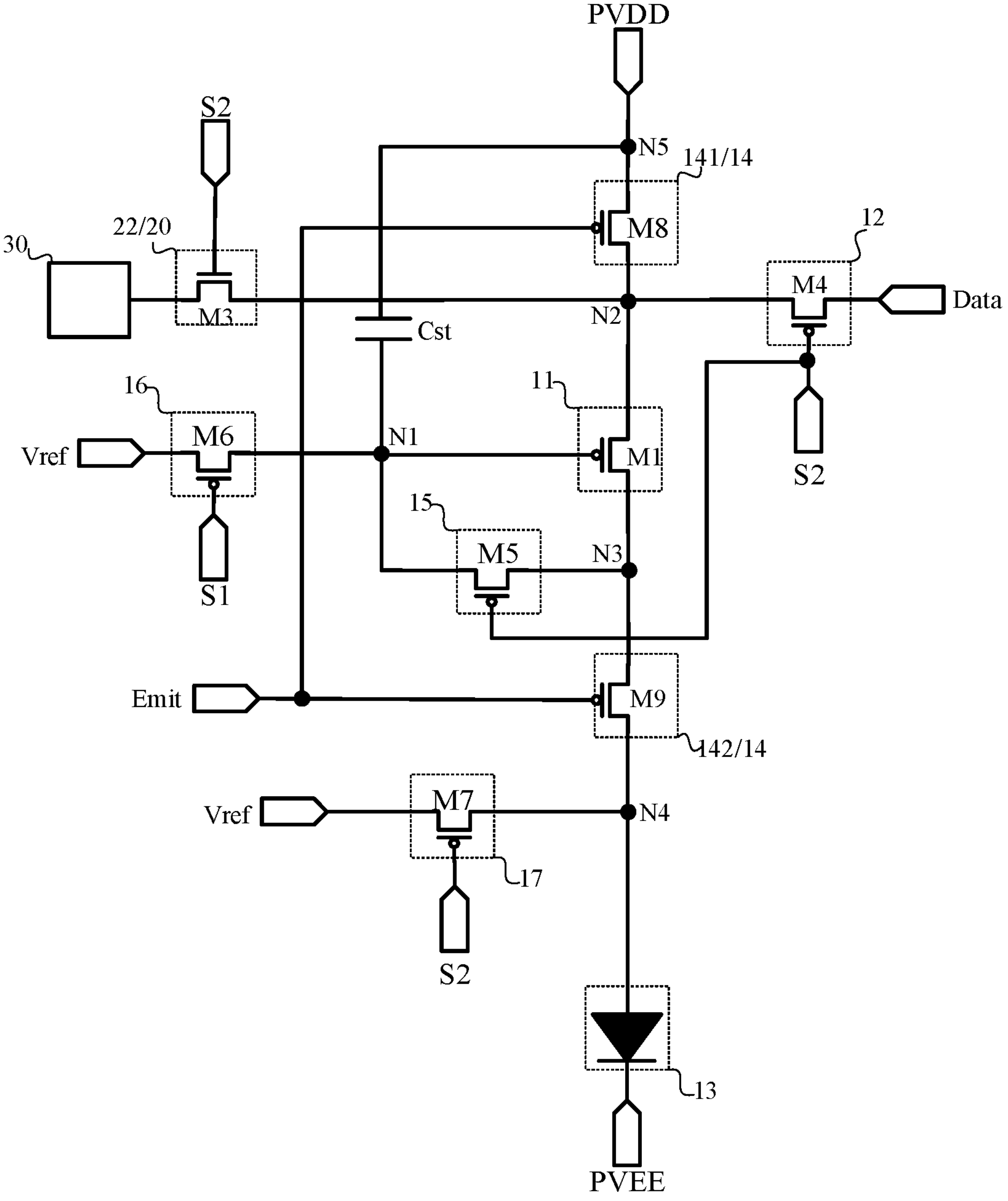
FIG. 7 shows yet another schematic structural diagram of a pixel circuit and a collecting module of a display panel according to an embodiment of the present application.
Figure 8:
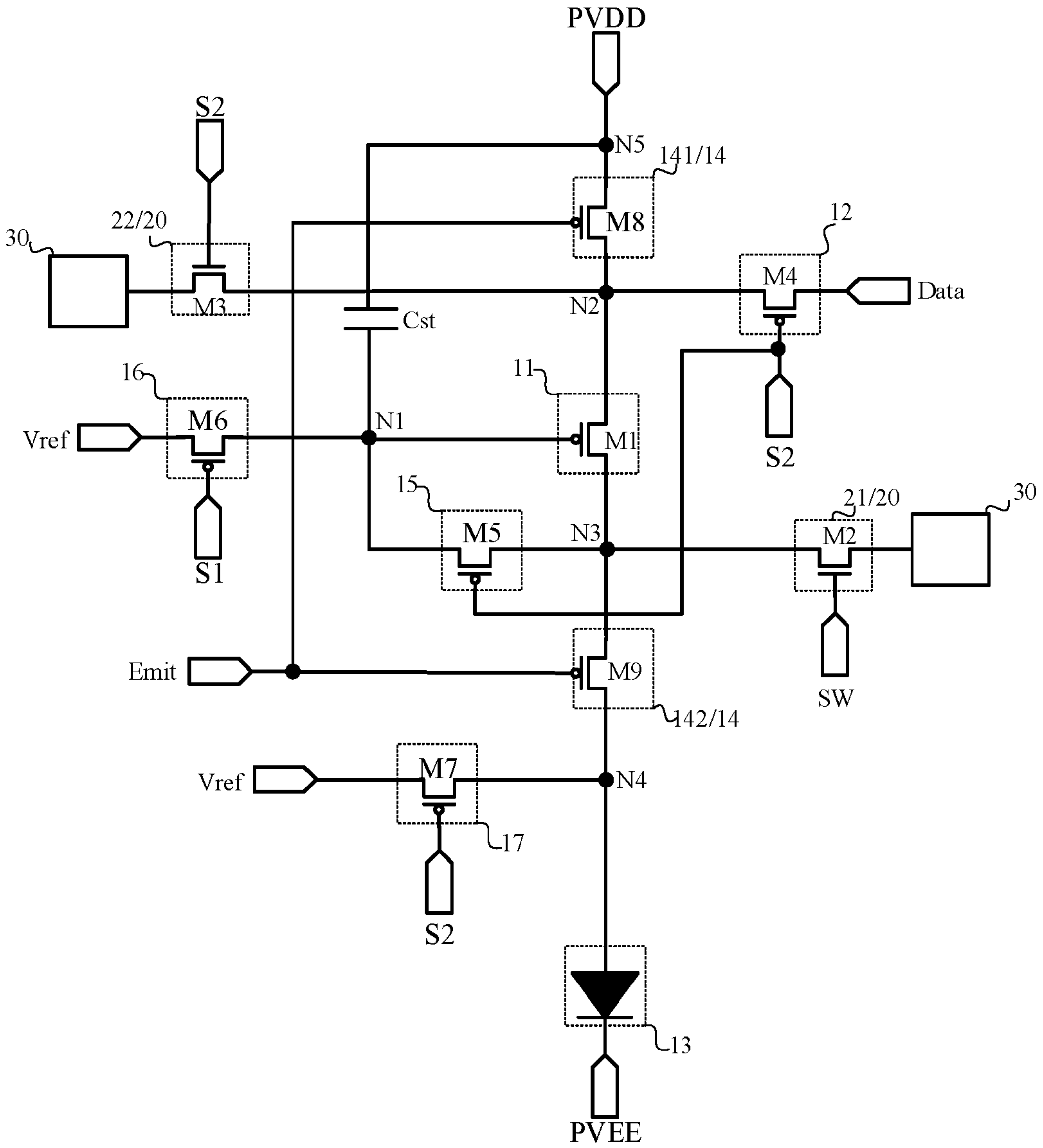
FIG. 8 shows yet another schematic structural diagram of a pixel circuit and a collecting module of a display panel according to an embodiment of the present application.

In some optional embodiments, as shown in FIG. 7 or FIG. 8, a first terminal of the data writing module 12 is electrically connected to the data signal terminal Data, and a second terminal of the data writing module 12 is electrically connected to the driving module 11. The collecting module 20 may include a second collecting module 22 electrically connected between the second terminal of the data writing module 12 and the feedback module 30, and the second collecting module 22 may be configured to collect a voltage of the second terminal of the data writing module 12 in the data writing stage of the pixel circuit. The feedback module can be configured to determine a second compensation voltage corresponding to the pixel circuit according to a voltage collected by the collecting module 22.

The pixel circuits on the same column may be electrically connected to the same data signal terminal Data, and at least a part of the pixel circuits on different columns may be electrically connected to different data signal terminals Data. For example, under the collecting mode, the data signal terminal Data may be configured to output an initial data voltage $V_{out}$ to the pixel circuits, and for the $i^{th}$ pixel circuit, a voltage actually received by the driving module 11 from the data signal terminal Data and collected by the second collecting module 22 is $V_i$, and then a second compensation voltage $Vi_{comp}=V_{out}-V_i$ corresponding to the $i^{th}$ pixel circuit may be determined. Under the normal display mode, the data signal terminal Data is configured to output a plurality of target data voltages to the pixel circuits on the same column respectively by time, and the target data voltage is a sum of the initial data voltage and the second compensation voltage. For example, a target data voltage corresponding to the $i^{th}$ pixel circuit is a sum of an initial data voltage $V_{out}$ and a second compensation voltage $Vi_{comp}$. As such, the data voltage of each of the pixel circuits may be compensated.

In some optional embodiments, as shown in FIG. 7 or FIG. 8, the second collecting module 22 may include a third transistor M3, a first terminal of the third transistor M3 is electrically connected to the second terminal of the data writing module 12, a second terminal of the third transistor M3 is electrically connected to the feedback module 30, a gate of the third transistor M3 and the control terminal of the data writing module 12 receive a same signal. The gate of the third transistor M3 and the control terminal of the data writing module 12 may be electrically connected to a same second scanning signal terminal S2.

In an example that the data writing module 12 includes the fourth transistor M4, a first terminal of the fourth transistor M4 is the first terminal of the data writing module 12, a second terminal of the fourth transistor M4 is the second terminal of the data writing module 12, and a gate of the fourth transistor M4 is the control terminal of the data writing module 12. The first terminal of the third transistor M3 and the second terminal of the fourth transistor M4 may be electrically connected at the second node N2.

The third transistor M3 and the fourth transistor M4 are of a same type, for example, both are P-type transistors. Under the collecting mode, and in the data writing stage t2 of the pixel circuit, the ON-level is provided by the second scanning signal terminal S2, the fourth transistor M4 is turned on, the data voltage provided by the data signal terminal Data may be transmitted to the second node N2 while the third transistor M3 is turned on, and a voltage of the second node N2 may be transmitted to the feedback module 30, so that the feedback module may be configured to determine the second compensation voltage corresponding to the pixel circuit according to the voltage collected by the third transistor M3.

In an example, as shown in FIG. 8, the display panel may include the first collecting module 21 and the second collecting module 22 at the same time, since the first collecting module 21 is configured to collect a voltage in the light-emitting stage of the pixel circuit and the second collecting module 22 is configured to collect a voltage in the data writing stage of the pixel circuit, the first collecting module 21 and the second collecting module 22 may be connected to the same feedback module 30, and the feedback module 30, based on voltage collecting stages corresponding to the first collecting module 21 and the second collecting module 22, may be configured to trigger and record voltages collected by the first collecting module 21 and the second collecting module 22.

Figure 9:
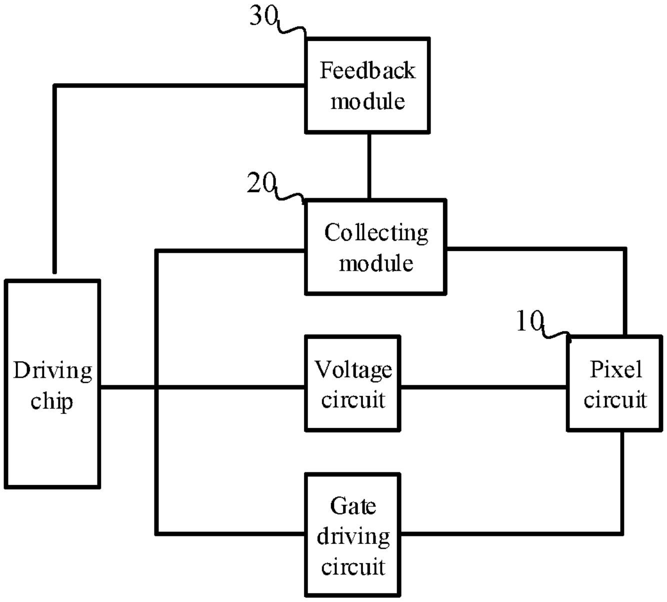
FIG. 9 shows a schematic diagram of a circuit of a display panel according to an embodiment of the present application.

As an example, as shown in FIG. 9, a voltage circuit may be configured to provide a power supply voltage and/or a data voltage to the pixel circuit, and a gate driving circuit may be configured to generate a gate signal to control the modules of the pixel circuit to be turned on or turned off. The voltage circuit, the gate driving circuit, and the collecting module 20 may be controlled by the driving chip. The collecting module 20 is configured to transmit a collected voltage actually received by the pixel circuit to the feedback module 30, the feedback module is configured to determine a compensation voltage according to a voltage collected by the collecting module 20 and feedback the compensation voltage to the driving chip, and the driving chip may control the voltage circuit to compensate the compensation voltage to the pixel circuit 10.

Optionally, the feedback module 30 may be integrated on the driving chip and may serve as a functional module of the driving chip.

It should be noted that, the transistors in the embodiments of the present application may be NMOS-type transistors or PMOS-type transistors. For NMOS type transistor, the ON-level is the high level and the OFF-level is the low level. That is, when a gate of the NMOS-type transistor is at the high level, the first terminal and the second terminal of the NMOS-type transistor are turned on, and when the gate of the NMOS-type transistor is at the low level, the first terminal and the second terminal of the NMOS-type transistor are turned off. For the PMOS-type transistor, the ON-level is the low level and the OFF-level is the high level. That is, when a control terminal of the PMOS-type transistor is at the low level, the first terminal and the second terminal of the PMOS-type transistor are turned on, and when the control terminal of the PMOS-type transistor is at the high level, the first terminal and the second terminal of the PMOS-type transistor are turned off. In a specific implementation, the gate of each transistor mentioned-above functions as the control terminal of the transistor, and according to the signal of the gate of each transistor and the type of the transistor, the first terminal of the transistor may function as the source and the second terminal of the transistor may function as the drain, or the first terminal of the transistor may function as the drain and the second terminal of the transistor may function as the source, which are not specifically distinguished. In addition, the ON-level and the OFF-level in the embodiments of the present application are generic reference, the ON-level refers to any level capable of turning on the transistor, and the OFF-level refers to any level capable of turning off the transistor.

Figure 10:
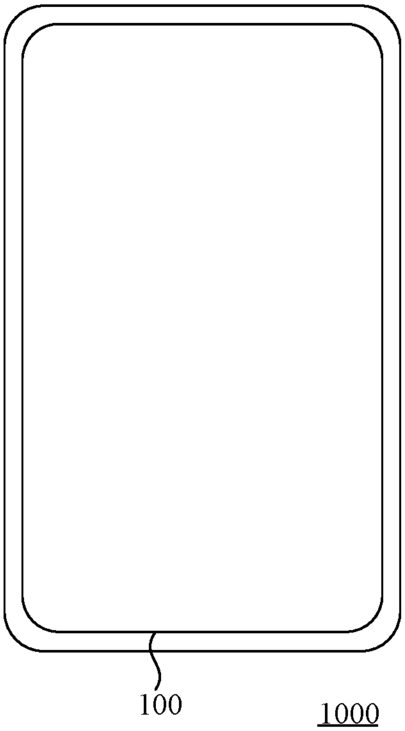
FIG. 10 shows a schematic structural diagram of a display device according to an embodiment of the present application.

Based on the same inventive concept, the present application further provides a display device including the display panel according to the present application. With reference to FIG. 10, FIG. 10 is a schematic structural diagram of a display device according to an embodiment of the present application. A display device 1000 provided by FIG. 10 includes the display panel 100 according to any one of the embodiments of the present application described above. In the embodiment of FIG. 10, a mobile phone is only given as an example to illustrate the display device 1000, and it can be understood that, the display device according to the embodiments of the present application may be other display devices with a display function, such as, a wearable product, a computer, a television, and a vehicle-mounted display device, which are not are not particularly limited by the embodiments of the present application. The display device according to the embodiment of the present application has beneficial effects of the display panel provided by the embodiments of the present application. For details, please refer to the specific descriptions of the display panel in the above embodiments, which are not repeated in this embodiment.

According to the embodiments of present application described above, these embodiments do not describe all details thoroughly or do not limit the application to be the only specific embodiments. Obviously, many modifications and variations can be made according to the above description. These embodiments are selected and specifically described in this specification to better explain principles and practical application of the present application, so that a person skilled in the art is able to utilize well the present application and use the modifications based on the present application. The present application is limited only by claims and the full scope and equivalents of the claims.

What is claimed is:

1. A display panel, wherein the display panel comprises pixel circuits, collecting modules and feedback modules, and the pixel circuit comprises a driving module, a data writing module, and a light-emitting module; wherein the data writing module is configured to transmit a voltage output by a data signal terminal to the driving module;

the driving module and the light-emitting module are electrically connected between a first power supply terminal and a second power supply terminal, and the driving module is configured to generate a driving current according to the voltage from the data signal terminal and a voltage from the first power supply terminal to drive the light-emitting module to emit light;

the collecting module is configured to collect at least one of a voltage actually received by the driving module from the data signal terminal and a voltage actually received by the driving module from the first power supply terminal; and the feedback module is configured to determine a compensation voltage corresponding to the pixel circuit according to a voltage collected by the collecting module, wherein the driving module comprises a first transistor, a first terminal of the first transistor is electrically connected to the first power supply terminal, and a second terminal of the first transistor is electrically connected to a first terminal of the light-emitting module;

the collecting module comprises a first collecting module, a first terminal of the first collecting module is electrically connected between the first terminal of the first transistor and the first power supply terminal, or the first terminal of the first collecting module is electrically connected between the second terminal of the first transistor and the first terminal of the light-emitting module, and a second terminal of the first collecting module is electrically connected to the feedback module; and the first collecting module is configured to collect a voltage actually received by the first transistor from the first power supply terminal in a light-emitting stage of the pixel circuit, wherein a first terminal of the data writing module is electrically connected to the data signal terminal, and a second terminal of the data writing module is electrically connected to the driving module; and the collecting module comprises a second collecting module electrically connected between the second terminal of the data writing module and the feedback module, the second collecting module is configured to collect a voltage of the second terminal of the data writing module in the data writing stage of the pixel circuit, and the feedback module is configured to determine a second compensation voltage corresponding to the pixel circuit according to the voltage collected by the second collecting module, wherein the second collecting module comprises a third transistor, a first terminal of the third transistor is electrically connected to the second terminal of the data writing module, a second terminal of the third transistor is electrically connected to the feedback module, and a gate of the third transistor and a control terminal of the data writing module receive a same signal, and wherein the gate of the third transistor and the control terminal of the data writing module are electrically connected to a same second scanning signal terminal, wherein the pixel circuit further comprises a first light-emitting controlling module and a second light-emitting controlling module, the first light-emitting controlling module is electrically connected between the first power supply terminal and the first terminal of the first transistor, and the second light-emitting controlling module is electrically connected between the second terminal of the first transistor and the first terminal of the light-emitting module; and the first terminal of the first collecting module is electrically connected to the first terminal of the first transistor, or the first terminal of the first collecting module is electrically connected to the second terminal of the first transistor.

2. The display panel according to claim 1, wherein the first collecting module comprises a second transistor, a first terminal of the second transistor is the first terminal of the first collecting module, a second terminal of the second transistor is the second terminal of the first collecting module, and a gate of the second transistor is electrically connected to a control signal terminal.

3. The display panel according to claim 2, wherein gates of second transistors corresponding to a plurality of the pixel circuits are electrically connected to a same control signal terminal.

4. The display panel according to claim 2, wherein second terminals of second transistors corresponding to a plurality of the pixel circuits on a same column are electrically connected to a same feedback module, and a column of the pixel circuits correspond to one feedback module.

5. The display panel according to claim 2, wherein an operation mode of the display panel comprises a collecting mode and a normal display mode, the second transistor is turned on under the operation mode, and the second transistor is turned off under the normal display mode.

6. The display panel according to claim 2, wherein the second transistor comprises a NMOS type transistor.

7. The display panel according to claim 1, wherein the collecting module is configured to collect the voltage actually received by the driving module from the first power supply terminal, and the feedback module is configured to determine a first compensation voltage corresponding to the pixel circuit according to the voltage collected by the collecting module;

a plurality of the pixel circuits are electrically connected to a same first power supply terminal;

an operation mode of the display panel comprises a collecting mode and a normal display mode;

under the collecting mode, the first power supply terminal is configured to output an initial power supply voltage;

under the normal display mode, the first power supply terminal is configured to output a plurality of target power supply voltages to a plurality of the pixel circuits respectively by time, wherein the target power supply voltage is a sum of the initial power supply voltage and the first compensation voltage.

8. The display panel according to claim 7, wherein under the normal display mode, in a duration of an image frame, light-emitting stages of a plurality of the pixel circuits electrically connected to a same first power supply terminal have no temporal overlap.

9. The display panel according to claim 8, wherein the pixel circuits on a same row are electrically connected to a same first power supply terminal;

under the normal display mode, the pixel circuits on a same row emit light sequentially in a duration of an image frame.

10. The display panel according to claim 9, wherein control terminals of data writing modules of the pixel circuits on a same row are electrically connected to a same scanning line, and under the normal display mode, in a duration of an image frame, a number of times that a signal on the scanning line is a valid pulse is equal to a number of the pixel circuits on a same row;

at an $i^{th}$ valid pulse, a target data voltage corresponding to an $i^{th}$ pixel circuit is written into the $i^{th}$ pixel circuit;

at a $(i+1)^{th}$ valid pulse, a target data voltage corresponding to a $(i+1)^{th}$ pixel circuit is written into the $(i+1)^{th}$ pixel circuit, and a black-state data voltage is written to the ith pixel circuit.

11. A display device, comprising a display panel, wherein the display panel comprises pixel circuits, collecting modules and feedback modules, and the pixel circuit comprises a driving module, a data writing module, and a light-emitting module; wherein the data writing module is configured to transmit a voltage output by a data signal terminal to the driving module;

the driving module and the light-emitting module are electrically connected between a first power supply terminal and a second power supply terminal, and the driving module is configured to generate a driving current according to the voltage from the data signal terminal and a voltage from the first power supply terminal to drive the light-emitting module to emit light;

the collecting module is configured to collect at least one of a voltage actually received by the driving module from the data signal terminal and a voltage actually received by the driving module from the first power supply terminal; and the feedback module is configured to determine a compensation voltage corresponding to the pixel circuit according to a voltage collected by the collecting module, wherein the driving module comprises a first transistor, a first terminal of the first transistor is electrically connected to the first power supply terminal, and a second terminal of the first transistor is electrically connected to a first terminal of the light-emitting module;

the collecting module comprises a first collecting module, a first terminal of the first collecting module is electrically connected between the first terminal of the first transistor and the first power supply terminal, or the first terminal of the first collecting module is electrically connected between the second terminal of the first transistor and the first terminal of the light-emitting module, and a second terminal of the first collecting module is electrically connected to the feedback module; and the first collecting module is configured to collect a voltage actually received by the first transistor from the first power supply terminal in a light-emitting stage of the pixel circuit, wherein a first terminal of the data writing module is electrically connected to the data signal terminal, and a second terminal of the data writing module is electrically connected to the driving module; and the collecting module comprises a second collecting module electrically connected between the second terminal of the data writing module and the feedback module, the second collecting module is configured to collect a voltage of the second terminal of the data writing module in the data writing stage of the pixel circuit, and the feedback module is configured to determine a second compensation voltage corresponding to the pixel circuit according to the voltage collected by the second collecting module, wherein the second collecting module comprises a third transistor, a first terminal of the third transistor is electrically connected to the second terminal of the data writing module, a second terminal of the third transistor is electrically connected to the feedback module, and a gate of the third transistor and a control terminal of the data writing module receive a same signal, and wherein the gate of the third transistor and the control terminal of the data writing module are electrically connected to a same second scanning signal terminal, wherein the pixel circuit further comprises a first light-emitting controlling module and a second light-emitting controlling module, the first light-emitting controlling module is electrically connected between the first power supply terminal and the first terminal of the first transistor, and the second light-emitting controlling module is electrically connected between the second terminal of the first transistor and the first terminal of the light-emitting module; and the first terminal of the first collecting module is electrically connected to the first terminal of the first transistor, or the first terminal of the first collecting module is electrically connected to the second terminal of the first transistor.

* * * * *